Aug. 20, 1968 O. E. SZEKELY 3,397,597
HYDRAULICALLY CONTROLLED PLANETARY DRIVE STRUCTURE
Filed March 21, 1966
FIG. 1
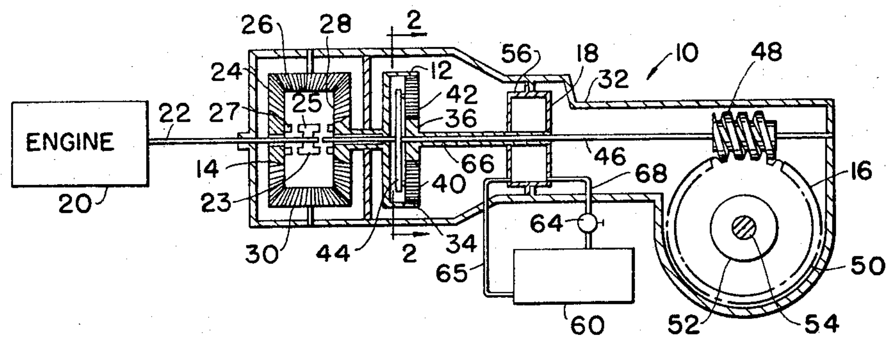
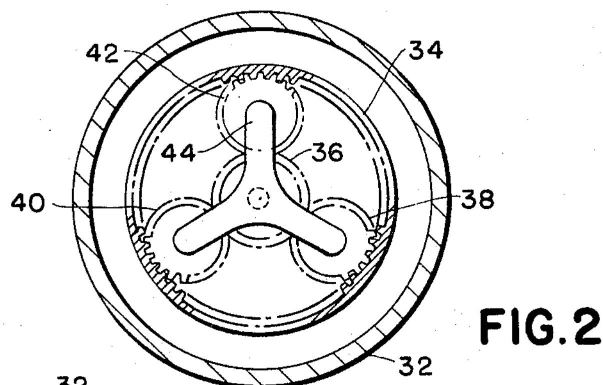
FIG. 2
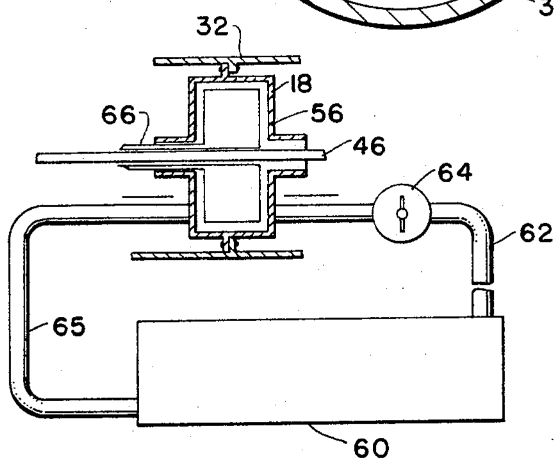
FIG. 3
INVENTOR.
OTTO E. SZEKELY
BY Whittemore, Hulbert & Belknap
ATTORNEYS

United States Patent Office 3,397,597
Patented Aug. 20, 1968

3,397,597

HYDRAULICALLY CONTROLLED PLANETARY DRIVE STRUCTURE

Otto E. Szekely, Palm Beach, Fla., assignor to A.E.M. Division, Power Flo Products, Inc., Hialeah, Fla., a corporation of Florida Filed Mar. 21, 1966, Ser. No. 535,848
4 Claims. (Cl. 74—782)

ABSTRACT OF THE DISCLOSURE

Automatic transmission structure comprising epicyclic gearing including an internal ring gear, a sun gear within the ring gear and a plurality of planet gears positioned between and in mesh with the ring gear and sun gear, reversible differential drive means connected to the ring gear at one side thereof, worm and worm gear output means connected to the planet gears through spider means on the differential side of the epicyclic gearing and hydraulic pump means connected to the sun gear for varying the speed and torque of the output means in relation to the speed and torque of the input means.

In the past it has been common, particularly in conjunction with small inexpensive engines, to provide mechanical shifting between a plurality of gears in a transmission to provide different speed and torque outputs from an engine running at more or less constant speed. While automatic transmissions have been known in the past and are in fact used a great deal in conjunction with larger engines, such as automobile engines or the like, the automatic transmissions of the past, particularly where they have been hydraulically controlled, have been complicated and expensive, so that their use has been limited.

It is therefore one of the objects of the invention to provide improved transmission structure.

Another object is to provide an automatic transmission including conversion structure for varying the speed and torque relation between input and output mechanism connected thereto and hydraulic control means for the conversion structure.

Another object is to provide automatic transmission structure as set forth above which is reversible.

Another object is to provide automatic transmission structure comprising an epicyclic gear set including an outer gear with internal gear teeth, a sun gear concentric with the outer gear and planet gears between the sun gear and outer gear in mesh therewith, reversible input mechanism connected to the outer gear, output mechanism connected to the planet gears and hydraulic control structure connected to the sun gear for varying the resistance to rotation thereof in accordance with a desired ratio between the input mechanism and output mechanism torque and speed.

Another object is to provide transmission structure which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a schematic diagram of automatic transmission structure constructed in accordance with the invention.

FIGURE 2 is an enlarged section view of the automatic transmission structure illustrated in FIGURE 1 taken substantially on the line 2—2 in FIGURE 1.

FIGURE 3 is an enlarged view of the hydraulic control structure of the automatic transmission structure illustrated in FIGURE 1.

With particular reference to the figures of the drawing, one embodiment of the present invention will now be considered in detail.

As shown in FIGURE 1, the automatic transmission 10 of the invention includes an epicyclic gear set 12 connected to input mechanism 14 and output mechanism 16. The speed and torque input and output ratio of the epicyclic gear set 12 is controlled by the hydraulic control structure 18. The input mechanism 14 is connected to the engine 20 and is driven thereby.

In operation engine speed and torque from input mechanism 14 is transmitted to the output mechanism 16 through the transmission 10. The ratio between the input engine speed and torque and the output mechanism speed and torque is controlled by the hydraulic control structure 18 to provide a smooth transition between different speed and torque ratios through control of the smallest most desirable member of the epicyclic gear set 12 as will be seen subsequently.

Engine 20 which may be, for example, a small electric engine is connected through shaft 22 to input mechanism 14 through the jaw clutch structure 23. The jaw clutch structure 23 may be moved axially on shaft 22 to which it is splined by known shifting mechanism to mesh the engageable projections 25 on the clutch structure 23 with the projections 27 on the bevel gears 24 and 28 of the input mechanism to drive the transmission 10 in opposite directions.

The input mechanism 14 may be a usual differential structure including, for example, four bevel gears 24, 26, 28 and 30 mounted for rotation in the transmission housing 32. As shown, the bevel gear 24 is connected to rotate on the engine output shaft 22, while the bevel gears 26 and 30 in mesh therewith are free running and are mounted on the housing 32. The bevel gear 28 is connected to and drives the epicyclic gear set 12.

The epicyclic gear set 12, as best shown in FIGURE 2, includes the outer gear with internal teeth 34, the inner sun gear 36 and the planet gears 38, 40 and 42 connected together by spider 44. The spider 44 is in turn connected directly to the output shaft 46 for rotation therewith.

The output mechanism 16 includes the worm 48 connected to the output shaft 46 for rotation with the worm gear 50 in mesh with the gear 48 within the transmission housing 32. The usual differential structure 52 is provided and is operable between the worm gear 50 and the output axle 54 extending from the worm gear 50. The output mechanism could of course be any conventional output structure, such as a bevel or spur gear drive, for example.

The hydraulic control structure 18, as shown best in FIGURE 3, includes a hydraulic high pressure pump 56. Thus, on driving of the pump, hydraulic fluid is passed in a closed circuit through the pump 56, the control valve 64, the hydraulic conduit 62, reservoir tank 60, and the hydraulic conduit 65 in the direction of arrow 67. Control valve 64 controls an opening in the conduit 62 through which the hydraulic fluid is pumped by the pump 56.

The pump 56 is directly driven through hollow drive shaft 66 concentric with the output shaft 46 and connected to the sun gear 36 of the epicyclic gear set 12. Thus the torque with which the sun gear 36 resists rotation is determined by the opening of the valve 64 since the opening of the valve 64 determines the resistance offered by the hydraulic fluid to operation of the pump 56 connected to the sun gear 36.

In overall operation, the engine 20 is run at a predetermined speed and will produce a predetermined torque. The input mechanism 14 will drive the outer gear of the epicyclic gear set 12 at a predetermined speed and torque in a direction selected through clutch mechanism 23. Due to the relative sizes of the gears 34, 36, 38, 40 and 42 of the epicyclic gear set 12 the output shaft 46 will be driven at a predetermined speed and torque relation to the driving of the outer gear 34 of the epicyclic gear set through the rotation of the planet gears 38, 40 and 42 of the epicyclic gear set. The output axle 54 will be provided with an output torque and speed directly related to the torque and speed of the output shaft 46.

The relation between the torque and speed of the engine output shaft 22 and the axle 54 may be varied by the hydraulic control structure 18 on varying opening of the valve 64. Thus, for example, with an epicyclic gear set having a three to one gear ratio, if the valve 64 is fully closed so that the pump 56 offers the maximum amount of torque resisting rotation of the sun gear 36, the output torque on the shaft 46 will be one hundred and fifty percent of the engine torque. The speed of the shaft will be sixty-six percent of the speed of the engine output shaft 22. As the valve 64 is opened the output torque and speed will decrease.

Thus it has been found that with a ten horsepower engine and with the engine running at 3600 revolutions per minute and developing an engine torque of 174 inch pounds that the output horsepower is 6.34 at an output speed of 1533 revolutions per minute and an output torque of 260 inch pounds. With such condition the hydraulic control structure developed 2.5 horsepower with a control speed of 2500 revolutions per minute and a control torque of 63 inch pounds. The overall efficiency of this example is thus seen to be seventy-five percent.

With the same engine developing 7.37 horsepower at 2300 revolutions per minute and an engine torque of 202 inch pounds, the output horsepower was found to be 7.37 at 1533 revolutions per minute at a torque of 303 inch pounds with control horsepower and speed both zero and control torque equal to 100 inch pounds for an overall efficiency of one hundred percent.

It will thus be seen that in accordance with the invention there is provided an automatic transmission in which while the elements are individual, they must operate together and depend upon each other for proper torque and speed conversion. In addition it will be seen that the automatic transmission structure is particularly advantageous in that control is produced through the smallest member of the gear set for the least performance required.

While one embodiment of the present invention has been disclosed in detail, it will be understood that other embodiments and modifications are contemplated. Thus, for example, it is not desired to be limited specifically to the particular differential input and worm and worm gear output mechanisms, or the epicyclic gear set in contrast to the other torque and speed conversion gear trains, or the particular hydraulic control thereof. It is therefore the intention to include all modifications, embodiments and equivalents as are suggested by the disclosed structure and as are defined by the appended claims within the scope of the invention.

I claim:

1. Automatic transmission structure comprising epicyclic gear, torque and speed conversion means including an internal ring gear, a sun gear positioned centrally of the ring gear, a plurality of planet gears positioned between the ring and sun gears and in mesh therewith, drive means connected to the ring gear on one side thereof, a spider connecting the planet gears on the drive means side of the ring gear, output means including an output shaft extending through the sun gear and into the drive means secured to the spider for rotation therewith and control structure connected to the sun gear and surrounding the output shaft for varying the resistance to rotation of the sun gear in mesh with the planet gears on driving of the ring gear.

2. Structure as set forth in claim 1 wherein the drive means comprises a reversible differential including a bevel gear connected to the ring gear for rotation therewith.

3. Structure as set forth in claim 2 wherein the output shaft extends through the bevel gear axially thereof and the output means further includes a worm in axial alignment with and connected to the output shaft and a worm gear engaged with the worm.

4. Structure as set forth in claim 3 wherein the control structure comprises a hydraulic pump including a rotor connected to the sun gear for rotation therewith, a closed hydraulic circuit connected to the pump and valve means in the hydraulic circuit for varying the resistance to pumping of hydraulic fluid by the pump through the hydraulic circuit.

References Cited

UNITED STATES PATENTS

| | | | |
|---|---|---|---|
| 1,542,701 | 6/1925 | Joyner | 74—778 |
| 2,896,476 | 7/1959 | Williams | 74—724 |

FOREIGN PATENTS

| | | |
|---|---|---|
| 367,696 | 2/1939 | Italy. |
| 1,018,963 | 1/1953 | France. |
| 1,034,911 | 8/1953 | France. |

FRED C. MATTERN, Jr., *Primary Examiner.*

ARTHUR T. McKEON, *Assistant Examiner.*